United States Patent
Chung et al.

(10) Patent No.: US 10,635,977 B2
(45) Date of Patent: Apr. 28, 2020

(54) MULTI-TASK LEARNING USING KNOWLEDGE DISTILLATION

(71) Applicant: Google LLC, Mountain View, CA (US)

(72) Inventors: Junyoung Chung, Gunpo-si (KR); Melvin Jose Johnson Premkumar, Sunnyvale, CA (US); Michael Schuster, Saratoga, CA (US); Wolfgang Macherey, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/458,506

(22) Filed: Jul. 1, 2019

(65) Prior Publication Data

US 2019/0325308 A1    Oct. 24, 2019

Related U.S. Application Data

(63) Continuation of application No. PCT/US2017/069102, filed on Dec. 29, 2017.

(60) Provisional application No. 62/441,119, filed on Dec. 30, 2016.

(51) Int. Cl.
    *G06N 3/08*   (2006.01)
    *G06F 17/28*  (2006.01)
    *G06N 3/04*   (2006.01)

(52) U.S. Cl.
    CPC .............. *G06N 3/08* (2013.01); *G06F 17/289* (2013.01); *G06N 3/0454* (2013.01)

(58) Field of Classification Search
    CPC ........................... G06N 3/084; G06F 16/3329
    USPC ..................................................... 706/15, 45
    See application file for complete search history.

(56) References Cited

U.S. PATENT DOCUMENTS

| | | | | |
|---|---|---|---|---|
| 2013/0325442 | A1* | 12/2013 | Dahlmeier | G06F 17/274 |
| | | | | 704/9 |
| 2016/0247501 | A1 | 8/2016 | Kim et al. | |
| 2016/0328644 | A1* | 11/2016 | Lin | G06N 3/08 |
| 2018/0129972 | A1* | 5/2018 | Chen | G06F 17/2818 |

OTHER PUBLICATIONS

Wu et al, "Google's Neural Machine Translation System: Bridging the Gap between Human and Machine Translation," arXiv, Oct. 2016, 23 pages.
Hinton et al, "Distilling the Knowledge in a Neural Network," arXiv, Mar. 2015, 9 pages.
Kim et al, "Sequence-Level Knowledge Distillation" arXiv, Sep. 2016, 11 pages.

(Continued)

*Primary Examiner* — David R Vincent
(74) *Attorney, Agent, or Firm* — Fish & Richardson P.C.

(57) ABSTRACT

Methods, systems, and apparatus, including computer programs encoded on computer storage media for performing multi-task learning. In one method a system obtains a respective set of training data for each of multiple machine learning tasks. For each of the machine learning tasks, the system configures a respective teacher machine learning model to perform the machine learning task by training the teacher machine learning model on the training data. The system trains a single student machine learning model to perform the multiple machine learning tasks using (i) the configured teacher machine learning models, and (ii) the obtained training data.

20 Claims, 3 Drawing Sheets

(56) References Cited

OTHER PUBLICATIONS

Firat et al., "Zero Resource Translation with Multi-Lingual Neural Machine Translation," arXiv, Jun. 13, 2016, 10 pages.
Geras et al., "Blending LSTMS Into CNNs," arXiv, Sep. 14, 2016, 13 pages.
Hu et al., "Deep neural networks with massive learned knowledge," Proceeding of the 2016 Conference on Empirical Methods in Natural Language Processing, Nov. 1, 2016, 10 pages.
PCT International Preliminary Report on Patentability in International Appln No. PCT/US2017/069102, dated Jul. 2, 2019, 17 pages.
PCT International Search Report and Written Opinion in International Appln. No. PCT/US2017/069102, dated Mar. 28, 2018, 10 pages.

* cited by examiner

MULTI-TASK LEARNING USING KNOWLEDGE DISTILLATION

CROSS-REFERENCE TO RELATED APPLICATIONS

This application is a continuation of International Application No. PCT/US2017/069102, filed on Dec. 29, 2017, which claims priority to U.S. Provisional Application No. 62/441,119, filed on Dec. 30, 2016. The disclosures of the prior applications are considered part of and are incorporated by reference in the disclosure of this application.

BACKGROUND

This specification relates to models for machine learning.

Example machine learning models include neural networks. Neural networks employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters. Neural networks may be trained on machine learning tasks using training data to determine trained values of the layer parameters and may be used to perform machine learning tasks on neural network inputs.

SUMMARY

In general, one innovative aspect of the subject matter described in this specification can be embodied in methods for obtaining a respective set of training data for each of a plurality of machine learning tasks; for each of the machine learning tasks, configuring a respective teacher machine learning model to perform the machine learning task by training the teacher machine learning model on the training data for the task; and training a single student machine learning model to perform all of the plurality of machine learning tasks using (i) the configured teacher machine learning models, and (ii) the obtained training data.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations training the single student machine learning model comprises: for each of the plurality of machine learning tasks: selecting one or more subsets from the set of training data for the machine learning task; processing the selected subsets using the respective teacher machine learning model to generate respective teacher machine learning model outputs; and training the single student machine learning model to perform the machine learning task using (i) the selected one or more subsets, and (ii) respective generated teacher machine learning model outputs.

In some implementations the teacher machine learning model outputs comprise soft target outputs.

In some implementations training the single student machine learning model to perform the machine learning task using (i) the selected one or more subsets, and (ii) respective generated teacher machine learning model outputs comprises, for each subset: augmenting the subset with an identifier for the machine learning task; processing the augmented subset using the student machine learning model to generate a student machine learning model output; and adjusting values of student machine learning model parameters to match the generated student machine learning model output to a respective generated teacher machine learning model output.

In some implementations the training data for each of the plurality of machine learning tasks comprises (i) an input text segment in an input language, and (ii) an output text segment in a target language that is different from the input language.

In some implementations the plurality of machine learning tasks comprise translating an input text segment in an input language into a target language.

In some implementations augmenting the subset with an identifier for the machine learning task comprises prepending each input text segment with a token identifying at least the target language.

In some implementations selecting one or more subsets from the set of training data for the machine learning task comprises selecting one or more sub-word units from the input text segment.

In some implementations each generated respective teacher machine learning model output comprises a probability distribution indicating a respective translation of the corresponding sub-word unit.

In some implementations the training data comprises an equal distribution of text segments in different languages.

In some implementations augmenting the subset with an identifier for the machine learning task comprises prepending the subset with a token identifier for the machine learning task.

In some implementations the student machine learning model is smaller in size than the teacher machine learning models.

In some implementations the student machine learning model is larger in size or the same size as the teacher machine learning models.

In some implementations the size of each of the teacher machine learning models is independent of the student machine learning model.

The subject matter described in this specification can be implemented in particular embodiments so as to realize one or more of the following advantages.

To perform multi-task machine learning, it is often required to configure large machine learning models using large amounts of labelled training data. Such requirements are often impractical. In some cases a large machine learning model may be computationally costly to train and may be impractical to run—particularly on a device with limited computational power or resources, e.g., a mobile user device such as a smartphone or laptop computer. In addition, large amounts of labelled training data is not always available.

A multi-task learning system, as described in this specification, applies knowledge distillation techniques to extract knowledge relating to multiple machine learning tasks from large "teacher" machine learning models. The extracted knowledge may be given to a single "student" machine learning model, which may be used to perform the multiple machine learning tasks. By combining complex and/or large machine learning models during training with small and/or less complex machine learning models during inference or testing, the multi-task learning system described in this specification may be computationally more efficient than other machine learning models that perform multi-task learning. For example, since the student machine learning model benefits from the knowledge learned by the teacher machine learning models, the student machine learning model architecture may be less complex than the teacher machine learning models, yet achieve comparable accuracy when performing the multiple machine learning tasks.

In addition, in some cases the reduction in architecture complexity may allow the student machine learning model to run locally on a private user device, e.g., a smartphone or laptop computer. Therefore, a multi-task learning system, as described in this specification, may be more practical than other multi-task learning systems that are computationally too demanding to run on a local user device.

Furthermore, a multi-task learning system, as described in this specification, allows for different sized teacher machine learning models to be trained to perform different machine learning tasks. Knowledge relating to the different machine learning tasks may then be distilled to the multi-task student machine learning model. This may be of particular benefit when the different machine learning tasks have differing task difficulties. By providing flexibility with the size of the teacher machine learning models, optimal sized teacher models may be trained to perform the machine learning tasks, thus improving the accuracy of the teacher machine learning models and, in turn, improving the accuracy of the multi-task student machine learning model.

In addition, a multi-task learning system, as described in this specification, may be used to train multiple multi-task student machine learning models for groups of related machine learning tasks. For example, different subsets of machine learning tasks and, in turn, teacher machine learning models, may be selected and knowledge from the respective teacher machine learning models distilled into respective multi-task student machine learning models. Such flexibility in grouping machine learning tasks may improve usability, accuracy and efficiency of the multi-task student machine learning models.

Furthermore, in some cases the system described in this specification may allow for a student machine learning model to be larger than the teacher machine learning models. This may increase the capacity of the multi-task student machine learning model to learn and gain knowledge from a very large number of teacher machine learning models, thus improving the accuracy of the student machine learning model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods and systems for performing multi-task learning using knowledge distillation. A student machine learning model is trained to perform multiple machine learning tasks using knowledge distilled from teacher machine learning models that have each been trained to respectively perform one of the multiple machine learning tasks. The student machine learning model is smaller in size compared to the teacher machine learning models, and is therefore faster to serve than the teacher machine learning models.

As an example, the methods and systems described in this specification may be used for multi-lingual neural machine translation—namely, translating between multiple languages using a single machine translation model. A small, student machine translation model may be trained to translate between multiple languages using several larger, teacher machine translation models that have each been trained to translate a respective language pair. As another example, the methods and systems described in this specification may be used to perform multi-sentiment prediction of given text segments—namely, predicting multiple different sentiments of a given text segment using a single machine learning model. A small, student machine learning model may be trained to predict multiple different sentiments using several larger, teacher machine learning models that have each been trained to predict a single respective sentiment.

Figure 1:
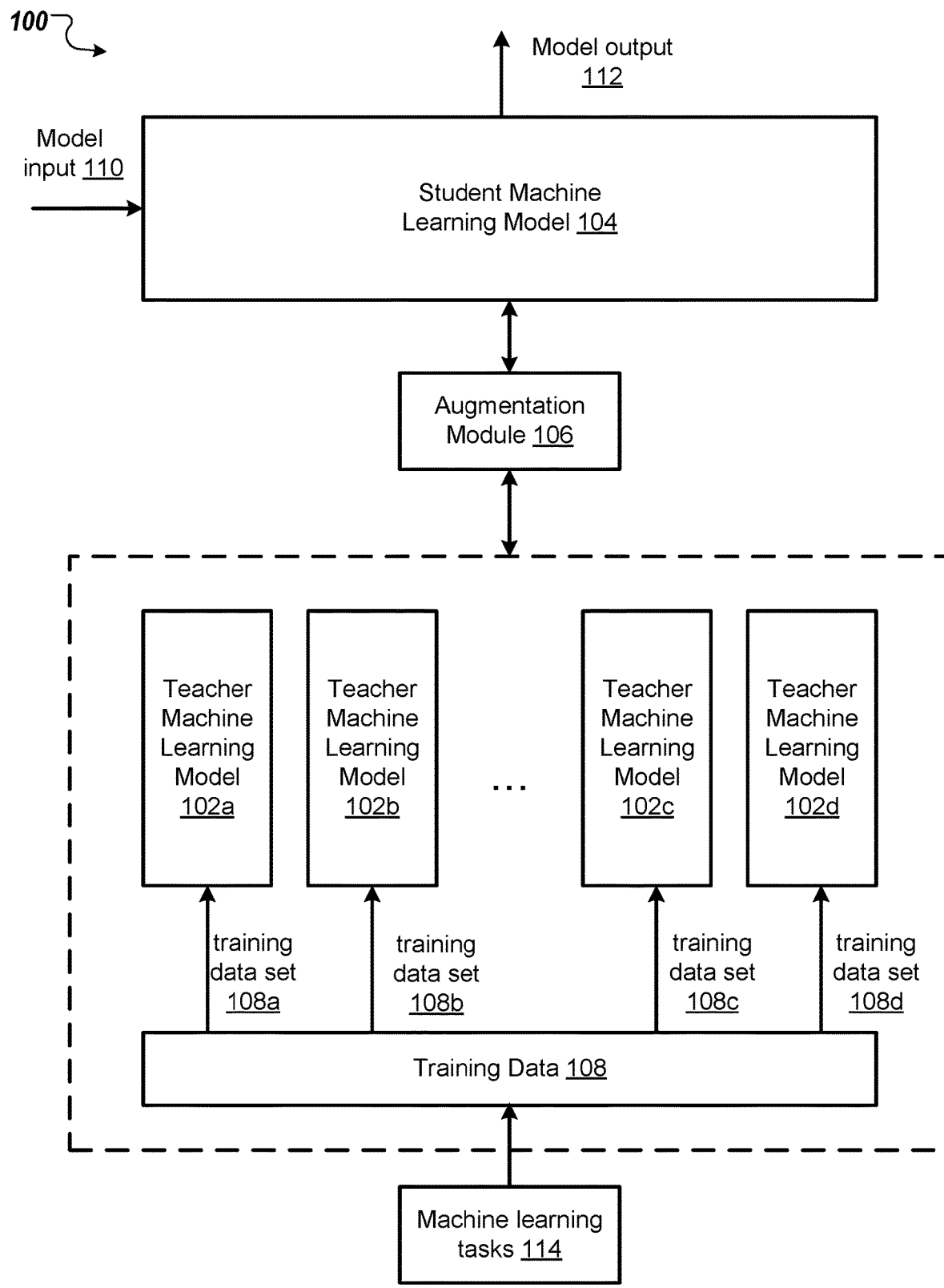
FIG. 1 shows an example multi-task learning system.

FIG. 1 shows an example multi-task learning system 100. The multi-task learning system 100 includes multiple teacher machine learning models 102a-102d, a single student machine learning model 104 and an augmentation module 106. The system 100 is an example of a system implemented as computer programs on one or more computers in one or more locations, in which the systems, components, and techniques described below can be implemented.

The multiple teacher machine learning models 102a-102d are machine learning models that are each configured to perform one of the multiple machine learning tasks 114 using training data 108. The training data 108 includes a respective set of training data for each of the multiple machine learning tasks 114. Each machine learning task, and in turn each set of training data, corresponds to one of the teacher machine models 102a-102d. For example, a first set of training data, e.g., training data set 108a, may be used to configure a first teacher machine learning model, e.g., teacher machine learning model 102a, to perform a first machine learning task. A second set of training data, e.g., training data set 108b, may be used to configure a second teacher machine learning model, e.g., teacher machine learning model 108b, to perform a second machine learning task. A third set of training data, e.g., training data set 108c, may be used to configure a third teacher machine learning model, e.g., teacher machine learning model 102c, to perform a third machine learning task. A fourth set of training data, e.g., training data set 108d, may be used to configure a fourth teacher machine learning model, e.g., teacher machine learning model 108d, to perform a fourth machine learning task. For convenience, four teacher machine learning models are illustrated in FIG. 1, however in some implementations the system 100 may include fewer or more teacher machine learning models.

The type of the teacher machine learning models 102a-102d included in the system 100 is dependent on the type of multiple machine learning tasks 114 performed by the system 100. For example, in some cases the multiple machine learning tasks 114 may include different classification tasks, such as machine translation tasks. In these cases the multiple teacher machine learning models may include neural networks. For example, one or more of the teacher machine learning models 102a-102d may include an encoder component and a decoder component that are both recurrent neural networks. In some implementations the decoder neural network may include an attention mechanism, and may include a softmax output layer. An example machine learning model for neural machine translation is described in detail in "Google's Neural Machine Translation System: Bridging the Gap between Human and Machine Translation," Wu, Yonghui, et al., arXiv: 1609.08144 (2016).

The size and structure of each teacher machine learning model 102a-102d may vary. For example, in the case where the multiple machine learning tasks 114 include multiple machine translation tasks, the size and structure of the multiple teacher machine learning models may vary dependent on whether the teacher machine learning models are being trained on training data in a high-resource language or a low-resource language. For example, a training data set that includes high-resource paired text segments, e.g., English and French, may include more training examples than a training data set that includes low-resource paired text segments, e.g., English and Punjabi. In this example, a teacher machine learning model that is configured to perform machine translation between English and French may be larger, e.g., in terms of neural network depth and/or number of neural network parameters, than a teacher machine learning model that is configured to perform machine translation between English and Punjabi. As another example, in the case where the multiple machine learning tasks 114 include multiple sentiment prediction tasks, a first teacher machine learning model that has been trained on training data to predict the sentiment of an English sentence may be a smaller model with a lower number of neural network nodes and a lower depth than a second teacher machine learning model that has been trained to translate text segments from English into French (which may be a full sized model).

Each of the teacher machine learning models 102a-102d may be configured to perform a respective machine learning task from the multiple machine learning tasks 114 using standard machine learning techniques. For example, in cases where one or more of the teacher machine learning models are neural networks, each neural network, e.g., teacher machine learning model 102a, may be trained on a respective set of training data, e.g., training data set 108a, by processing a training input included in the set of training data to generate a corresponding output according to a given machine learning task. The output may then be compared to a known training output included in the set of training data by computing a loss function, and backpropagating loss function gradients with respect to current neural network parameters to determine an updated set of neural network parameters that minimizes the loss function.

In some implementations the outputs generated by the teacher machine learning models 102a-102d may include sets of soft target outputs, i.e., soft probability distributions. For example, in cases where a machine learning model is trained to perform image classification, the model may be trained with an image of an object, e.g., a tree, with a labeled output, e.g., "tree." The corresponding output vector may take the form [0, 0, . . . , 1, 0, 0], where the "1" entry corresponds to the image class for the object "tree." However, in the case of using soft target outputs, the teacher machine learning model may output a vector with soft entries, e.g., [0.01, 0.04, . . . , 0.6, 0.3, 0.02], where the "0.6" entry corresponds to the image class for the object "tree." The "0.3" entry may correspond to an object that is similar to a tree, e.g., a forest, whereas the entries "0.01, 0.04, . . . " may correspond to objects that are not similar to a tree. Using soft target outputs enables a machine learning model to learn information about the similarity of output classes.

The student machine learning model 104 is a machine learning model that may be configured to perform all of the multiple machine learning tasks 114. The type of student machine learning model 104 included in the system 100 is dependent on the type of multiple machine learning tasks 114 performed by the system 100. For example, as described above, in some cases the multiple machine learning tasks 114 may include different classification tasks, such as natural language classification tasks. In these cases the student machine learning model 104 may be a neural network, e.g., including one or more recurrent neural network layers. The size and structure of the student machine learning model 104 is also dependent on the type and number of multiple machine learning tasks 114 performed by the system 100, as well as computational resources available to the student machine learning model 104. For example, a student machine learning model 104 that is configured to run on a local, user device may be smaller than a student machine learning model that is configured to run remotely, e.g., at a datacenter.

The size of a machine learning model may be defined by the number of trainable parameters (or "nodes") included in the machine learning model. For example, a first neural network model that includes the same number of layers as a second neural network model, i.e., has a same depth as a second neural network model, but has more nodes per layer than the second neural network model, e.g., has a bigger width than the second neural network model, may be referred to as being larger than the second neural network model. As another example, a first neural network model whose layers are of a same width as a second neural network model, but includes more layers than the second neural network model, i.e., is deeper than the second neural network model, may be referred to as being larger than the second neural network model.

In some implementations the student machine learning model 104 is smaller than the teacher machine learning models 102a-102d. That is, the student machine learning model 104 may include less trainable parameters than the teacher machine learning models 102a-102d. For example, the student machine learning model 104 may be smaller than the smallest of the teacher machine learning models. As another example, the student machine learning model 104 may be smaller than all of the teacher machine learning models 102a-102d combined, e.g., the number of student machine learning model trainable parameters may be smaller than the total number of trainable parameters included in all of the teacher machine learning models 102a-102d. A student machine learning model 104 that is smaller than the teacher machine learning models 102a-102d may be advantageous in certain settings. For example, a small student machine learning model 104 may be computationally more practical and efficient in settings where the student machine learning model 104 is to be deployed on a mobile device, e.g., a smartphone or tablet.

In other implementations the student machine learning model 104 may be the same size as one or more of the teacher models 102a-102d, or larger than one or more of the teacher models 102a-102d. That is, the student machine learning model 104 may include more trainable parameters than the teacher machine learning models 102a-102d. A student machine learning model 104 that is larger than the teacher machine learning models 102a-102d may be advantageous in certain settings. For example, a large student machine learning model 104 may be more accurate in settings where the student machine learning model 104 is to be deployed on a server hosting one or many GPUs, or hardware accelerators such as tensor processing units.

Generally, the size of the student machine learning model 104 may be chosen based on a variety of factors, including the number of and type of multiple machine learning tasks to be performed by the student machine learning model 104, the computational resources available to deploy the student machine learning model 104, and the size and number of teacher machine learning models 102a-102d.

The student machine learning model 104 may be configured to perform each of the multiple machine learning tasks 114 using the configured multiple teacher machine learning models 102a-102d and the training data 108. For example, for each machine learning task in the multiple machine learning tasks 114, the system 100 may be configured to select training examples from a corresponding set of training data, e.g., training data set 108a, for the machine learning task, and process the selected training examples using a respective configured teacher machine learning model, e.g., teacher machine learning model 102a, to generate a teacher machine learning model output for the selected training example. The system 100 may further be configured to process the selected training examples using the student machine learning model 104 to generate a student machine learning model output.

The generated student machine learning model output may be compared to the generated teacher machine learning output, and used to determine an updated set of student machine learning model parameters that minimizes the difference between the generated student machine learning model output and the teacher machine learning output. As described above, the teacher machine learning models may be trained using soft target outputs. By using the teacher machine learning models 102a-102d and training data 108 to train the student machine learning model 104, the student machine learning model 104 may benefit from the soft targets and learn more information, e.g., relating to similarities between outputs, from the teacher machine learning models 102a-102d. Transferring knowledge to a student machine learning model through a training process that uses soft target distributions is described in more detail in "Distilling the Knowledge in a Neural Network," Hinton et al, https://arxiv.org/abs/1503.02531.

By repeating this process for each machine learning task in the multiple machine learning tasks 114, the student machine learning model 104 may learn to perform the multiple machine learning tasks 114. Training a student machine learning model to perform multiple machine learning tasks is described in more detail with reference to FIG. 2 below.

Since the student machine learning model 104 is configured to perform multiple machine learning tasks, e.g., multiple machine learning tasks 114, the student machine learning model 104 may further receive data identifying a machine learning task to be performed on the model input 110. For example, in some cases the model input 110 may be a text segment in an input language, e.g., "Hello, how are you?" and the machine learning task to be performed on the text segment may be to translate the text segment from the input language into a target language, e.g., translate "Hello, how are you?" from English into German. In this example, the student machine learning model 104 may receive data identifying that the sentence "Hello, how are you?" is to be translated into German, e.g., through use of a prepended token indicating the target language, as described above. The generated model output 112 would then be a translation of the model input in the target language, e.g., "Hallo, wie geht es Ihnen?"

In some implementations the augmentation module 106 may be used to process selected training examples using the student machine learning model 104. For example, the augmentation module 106 may be configured to augment a received student machine learning model input, e.g., a training example, with a token identifying the machine learning task to be performed on the student machine learning model input. For example, as described above, in some implementations a machine learning task to be performed on a given input, e.g., the sentence "how are you?" may be to translate the input from an input language, e.g., English, into a target language, e.g., French. In this example, the augmentation module 106 may be configured to prepend a token indicating at least the target language to the model input. For example, the augmentation module 106 may prepend the token <2xx>, where "xx" represents a target language code, e.g., EN for English or FR for French. Continuing the example above, the augmented model input may be <2FR> how are you?

Once the student machine learning model 104 has been configured to perform each of the multiple machine learning tasks 114, the student machine learning model 104 may receive a model input, e.g., model input 110, and to process the received model input to generate a model output, e.g., model output 112.

Figure 2:
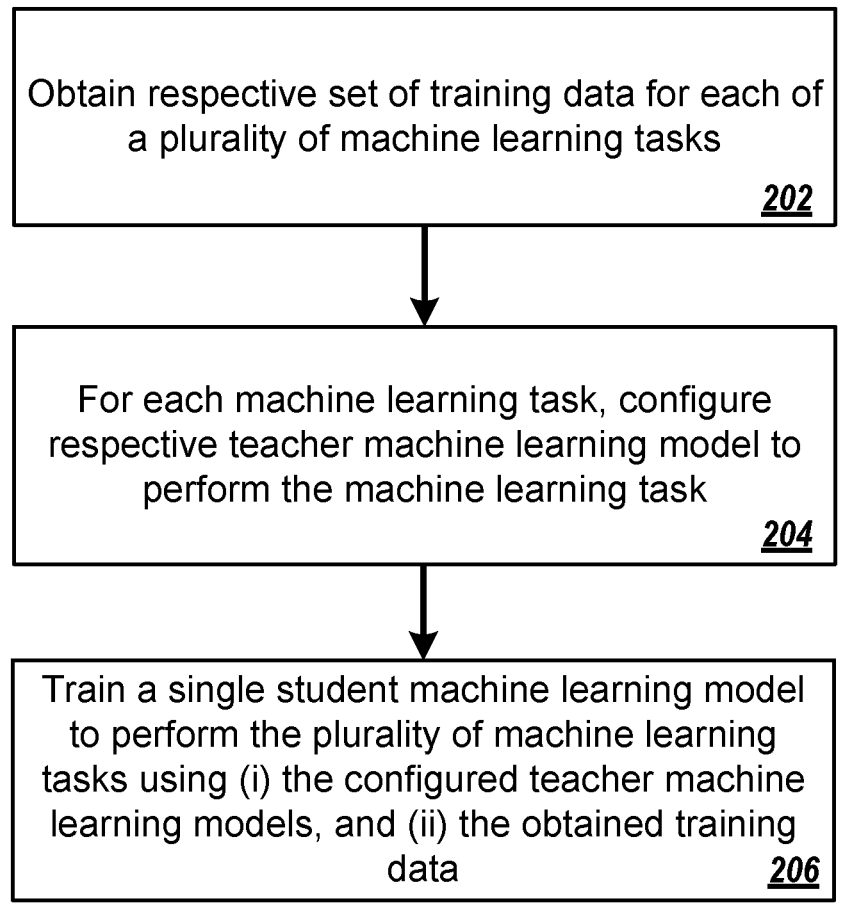
FIG. 2 is a flow diagram of an example process for performing multi-task learning.

FIG. 2 is a flow diagram of an example process for performing multi-task learning. For convenience, the process 200 will be described as being performed by a system of one or more computers located in one or more locations. For example, a system configured to perform multi-task learning, e.g., the multi-task learning system 100 of FIG. 1, appropriately programmed in accordance with this specification, can perform the process 200.

The system obtains a respective set of training data for each of multiple machine learning tasks (step 202). A set of training data for a machine learning task may include one or more training examples. For example, the set of training data may include one or more paired datasets, where each of the paired datasets includes an input dataset paired with an output dataset that represents targets for the input dataset. For example, in some implementations the multiple machine learning tasks may include multiple machine translation tasks, e.g., translating a given text segment in an input language into a text segment in a target language. In these cases, the set of training data for each machine learning task may include (i) input text segments in an input language, and (ii) corresponding output text segments in a target language that is different from the input language.

In some implementations the combined sets of training data for the machine learning tasks may include an equal distribution of text segments in different languages, e.g., the amount of training data for each machine learning task may be the same so that each language is equally represented in the combined training data. For example, in some cases a first set of available training data for performing machine translation for a first language pair, e.g., English and French, may be larger than a second set of available training data for performing machine translation for a second language pair, e.g., English and German. In this case, the second set of training data may be oversampled to generate an oversampled training data set that is of the same size as the first set of training data. The first set of training data and oversampled set of training data may then be used to train the student machine learning model. In this manner, the student machine learning model is exposed to an equal amount of training data for each machine learning task.

For each of the machine learning tasks, the system configures a respective teacher machine learning model to perform the machine learning task (step 204). The system configures the teacher machine learning models by training each of the teacher machine learning models on a respective set of obtained training data. The system may train the teacher machine learning models using standard machine learning techniques. For example, in cases where a teacher machine learning model is a neural network, the system may train the neural network on the respective set of training data by processing a training input included in the set of training data to generate a training output according to a given machine learning task. The system may then compare the training output to a known output included in the set of training data by computing a loss function, and backpropagating loss function gradients with respect to current neural network weights to determine an updated set of neural network weights that minimizes the loss function, as described above with reference to FIG. 1.

The system trains a single student machine learning model to perform the plurality of machine learning tasks (step 206). The system trains the student machine learning model using (i) the configured teacher machine learning models, and (ii) the obtained training data, e.g., the union of training examples included in the sets of training data.

As described above with reference to FIG. 1, the size of the student machine learning model may vary, e.g., depending on the number of and type of the multiple machine learning tasks, the computational resources available to deploy the student machine learning model, and/or the size and number of the configured teacher machine learning models.

In some implementations the student machine learning model may be smaller in size than the teacher machine learning models. For example, the student machine learning model may include less trainable parameters than each of the individual teacher machine learning models, or less trainable parameters than the combined teacher machine learning models.

In other implementations the student machine learning model may be the same size as one or more of the multiple teacher models, or larger than one or more of the multiple teacher models. For example, the student machine learning model may include more trainable parameters than each of the individual teacher machine learning models, or more trainable parameters than the combined teacher machine learning models.

The system trains the single student machine learning model using knowledge distillation techniques, as described above with reference to FIG. 1. The details of training a single student machine learning model to perform multiple of machine learning tasks using (i) configured teacher machine learning models, and (ii) training data used to configure the teacher machine learning models is described in more detail below with reference to FIG. 3.

In some implementations, the system may continue the process for performing multi-task learning by providing the student machine learning model for further processing. For example, in some cases the above described steps 202-206 may be repeated for multiple sets of training data that correspond to respective sets of machine learning tasks to generate multiple student machine learning models. The system may then perform the steps 202-206 again, this time using the generated student machine learning models as teacher machine learning models, to generate a final student machine learning model. For example, the system may perform the process 200 N times for a respective large teacher machine learning model to generate N smaller student machine learning models, e.g., Large bilingual teacher model 1→small bilingual student 1
Large bilingual teacher model N→small bilingual student N The system may then perform the process 200 using the N smaller student machine learning models as teacher machine learning models to generate a final student machine learning model, e.g.,

[small bilingual student 1, . . . , small bilingual student N]→final multi-lingual student In some cases it may be beneficial, e.g., to improve model accuracy, to generate a final student machine learning model that is larger than the N smaller student machine learning models. Repeating the process 200 in this manner can improve the accuracy of a final generated machine learning model.

Figure 3:
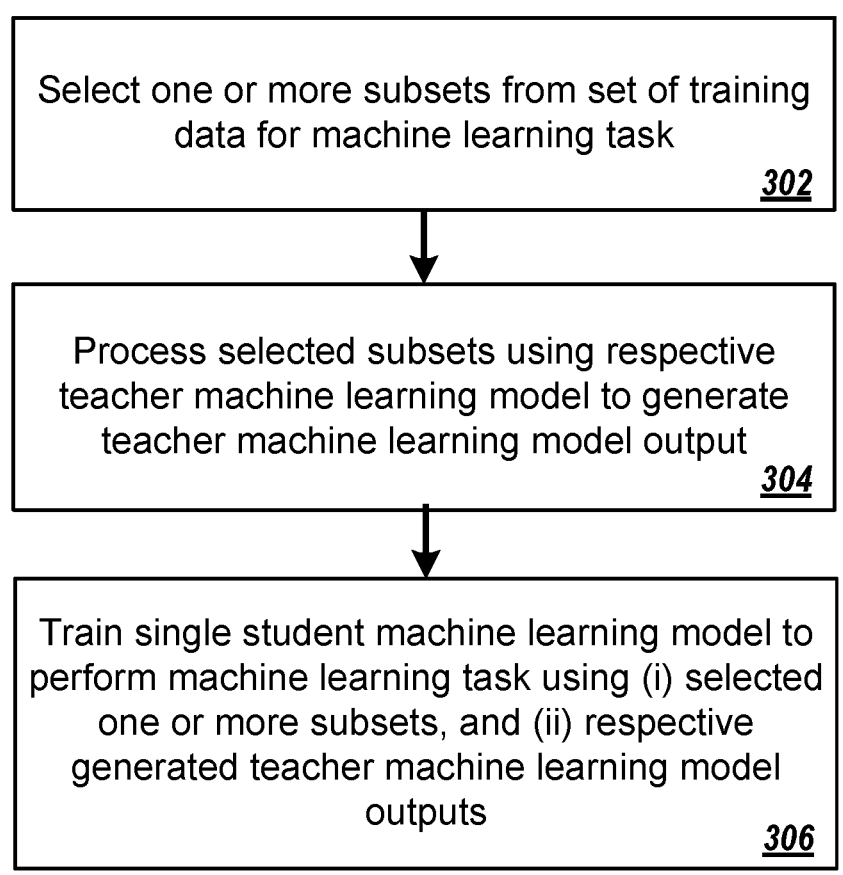
FIG. 3 is a flow diagram of an example process 300 for training a student machine learning model to perform multiple machine learning tasks.

FIG. 3 is a flow diagram of an example process 300 for training a student machine learning model to perform multiple machine learning tasks. For example, the process 300 may be used to train the student machine learning model 104 of FIG. 1. For convenience, the process 300 will be described as being performed by a system of one or more computers located in one or more locations. For example, a multi-task learning system, e.g., the system 100 of FIG. 1, appropriately programmed in accordance with this specification, can perform the process 300.

For each of the multiple machine learning tasks, the system selects one or more subsets from the set of training data for the machine learning task (step 302). For example, as described above with reference to FIG. 2, in some implementations the multiple machine learning tasks may include multiple machine translation tasks, e.g., translating a given text segment into a text segment in a target language. In these cases, the set of training data for the machine learning task may include (i) input text segments in an input language, and (ii) output text segments in a target language that is different from the input language. The system may therefore select one or more input text segments in the input language from the set of training data for the machine translation task, e.g., the phrase "how are you" from a set of training data corresponding to the task of translating input text segments in English into respective output text segments in German.

The system processes the selected subsets using respective teacher machine learning models to generate respective teacher machine learning model outputs (step 304). In some implementations the system may divide a selected subset into one or more units before processing. For example, in cases where the machine learning task is a machine translation task to translate an input text segment from English into German, the system may select a sentence from the text segment, e.g., "how are you" and divide the sentence into one or more words or sub-word units. The system may then process the divided selected subset in sequence using a respective teacher learning model.

The generated respective teacher machine learning model outputs may include probability distributions indicating a likely model output that corresponds to the received input. For example, in cases where the machine learning tasks are machine translation tasks, the generated respective teacher machine learning model outputs may include probability distributions indicating likely translations of the corresponding selected subsets. In some implementations the probability distributions are soft target distributions. For example, instead of outputting a vector [0, 0, . . . , 1, 0, 0], where the "1" entry corresponds to a particular output class, e.g., a class representing that a received input corresponds to a particular word or sub word unit, the teacher machine learning models may output soft target vectors, whose entries also sum to one but are distributed across different classes, e.g., [0.01, 0.04, . . . , 0.6, 0.2, 0.02].

To illustrate, in some cases the multiple machine learning tasks may include the tasks of translating a given text segment from English to German, and translating a given text segment from English to French. In this case, the system may select one or more English sentences from the set of training data used to train one of the teacher machine learning models to perform machine translation from English to German, e.g., the English sentence "how are you." Optionally, the system may divide the one or more English sentences into one or more word or sub-word units. The system may process the selected one or more English sentences using the teacher machine learning model that was trained to perform machine translation from English to German. The system may obtain, as output, one or more respective probability distributions indicating likely translations of the one or more sentences into German. The system may then select one or more English sentences from the set of training data used to train one of the teacher machine learning models to perform machine translation from English to French, e.g., the same English sentence "how are you." Optionally, the system may divide the one or more English sentences into one or more word or sub-word units. The system may process the selected one or more English sentences using the teacher machine learning model that was trained to perform machine translation from English to French. The system may obtain, as output, one or more respective probability distributions indicating likely translations of the one or more sentences into French. In some implementations the outputs generated by the teacher machine learning models may include sequences of probability distributions corresponding to translations of sequences of word or sub-word units, e.g., that may be combined to form a sentence or other portion of text.

The system trains the single student machine learning model to perform each of the multiple machine learning tasks using (i) the selected one or more subsets, and (ii) respective generated teacher machine learning model outputs (step 306). Since the generated teacher machine learning model outputs may include soft target probability distributions, as described above, training the student machine learning model using the teacher machine learning model outputs may enable the student machine learning model to learn more information from the teacher models, e.g., indicative of similarities between possible teacher machine learning model outputs.

In some implementations, the system trains the single student model by first, for each selected subset, augmenting the subset with an identifier for the machine learning task. For example, the system may prepend each input text segment in the subset with a token identifying the machine learning task. In cases where the machine learning task is a machine translation task, e.g., the task of translating an input text segment into a text segment in a target language, the system may prepend each input text segment in the subset with a token identifying at least the target language. For example, the system may prepend the input text segment in the input language with a "<2xx>" token, where xx represents a target language code, e.g., EN for English or DE for German. As another example, in cases where the model input is a text segment and the machine learning task includes predicting a sentiment of the text segment, the system may prepend the text segment with a "<2sentiment>" token.

The system may process an augmented subset using the student machine learning model to generate a respective student machine learning model output. The system may then adjust the values of student machine learning model parameters to match the generated student machine learning model to a corresponding generated teacher machine learning model output.

For example, in the case where the system is training the single student machine learning model to perform multilingual machine translation from English into German and into French, the system may select a first input text segment in English from a set of training data used to train a first teacher machine learning model to translate given text segments in English into German, and a second input text segment in English from a set of training data used to train a second teacher machine learning model to translate given text segments in English into French. In this example, the first input text segment may be the same as the second input text segment, e.g., the sentence "how are you."

The system may then augment the first input text segment with a token identifying the target language as being German, e.g., the token "<2DE>", and process the augmented sentence, e.g., "<2DE> how are you," using the student machine learning model to generate a student machine learning model output indicating a likely translation of the English sentence "how are you" into German. The system may then adjust the values of parameters of the single student machine learning model to match the generated machine learning model output to the respective machine learning model output generated by respective teacher machine learning model in step 304.

The system may then repeat the procedure and augment the second input text segment with a token identifying the target language as being French, e.g., "<2FR>", and process the augmented sentence, e.g., "<2FR> how are you," using the student machine learning model to generate a student machine learning model output indicating a likely translation of the sentence "how are you" into French. The system may then adjust the values of parameters of the single student machine learning model to match the generated machine learning model output to the respective machine learning model output generated by respective teacher machine learning model in step 304. By augmenting the input text segments with tokens identifying the target languages, the system can ensure that subsequent adjustments do not interfere with or "wash out" previously made adjustments, e.g., adjustments made to the values of the student machine learning model parameters when training on English-French training data does not affect previously made adjustments from training on English-German.

In some implementations the system may adjust the values of the parameters of the single student machine learning model by comparing each student machine learning model output to a respective teacher machine learning model output. For example, in cases where the machine learning models are neural networks, such comparing may include computing a loss function between the two outputs, and backpropagating loss function gradients with respect to current student machine learning model parameters to determine an updated set of student machine learning model parameters that minimize the loss function, as described above with reference to FIG. 1.

The system may repeat the above described procedure to exhaust the sets of training data for each machine learning task. That is, until each subset of input training data has been augmented and processed by the student machine learning model. In this manner, the student machine learning model learns to perform each machine learning task that the combination of the teacher machine learning models are configured to perform.

For illustrative purposes, the system and methods described in this specification have used multi-lingual machine translation as a primary example use case. However, the system and methods described may be applied to a variety of other settings, including other natural language tasks such as parsing or part of speech tagging. For example, the systems and methods can be applied to a setting where one or more teacher machine learning models are trained on respective training data to perform parsing, e.g., receiving as input an English sentence and providing as output a parse tree representation of the English sentence. One or more other teacher machine learning models may be trained on respective training data to perform machine translation, e.g., receiving as input a text segment in English and providing as output a corresponding text segment in French. A student machine learning model may then be trained using the multiple teacher machine learning models and their respective training data to perform both parsing and machine translation.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g. an HTML page, to a user device, e.g. for purposes of displaying data to and receiving user input from a user interacting with the user device, which acts as a client. Data generated at the user device, e.g. as a result of the user interaction, can be received from the user device at the server.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
obtaining a respective set of training data for each of a plurality of machine learning tasks;
for each of the machine learning tasks, configuring a respective teacher machine learning model to perform the machine learning task by training the teacher machine learning model on the training data for the task; and
training a single student machine learning model having a plurality of student machine learning model parameters to perform all of the plurality of machine learning tasks using (i) the configured teacher machine learning models, and (ii) the obtained training data, wherein training the single student machine learning model comprises:
for each of the plurality of machine learning tasks:
selecting one or more subsets from the set of training data for the machine learning task;
processing the selected subsets using the respective teacher machine learning model to generate respective teacher machine learning model outputs; and
training the single student machine learning model to perform the machine learning task using (i) the selected one or more subsets, and (ii) respective generated teacher machine learning model outputs, comprising, for each subset:
augmenting the subset with an identifier for the machine learning task;
processing the augmented subset using the student machine learning model to generate a student machine learning model output; and
adjusting values of the student machine learning model parameters to match the generated student machine learning model output to the respective generated teacher machine learning model output for the subset.

2. The method of claim 1, wherein the teacher machine learning model outputs comprise soft target outputs.

3. The method of claim 1, wherein the training data for each of the plurality of machine learning tasks comprises (i) an input text segment in an input language, and (ii) an output text segment in a target language that is different from the input language.

4. The method of claim 3, wherein the plurality of machine learning tasks comprise translating an input text segment in an input language into a target language.

5. The method of claim 4, wherein augmenting the subset with an identifier for the machine learning task comprises prepending each input text segment with a token identifying at least the target language.

6. The method of claim 3, wherein selecting one or more subsets from the set of training data for the machine learning task comprises selecting one or more sub-word units from the input text segment.

7. The method of claim 6, wherein each generated respective teacher machine learning model output comprises a probability distribution indicating a respective translation of the corresponding sub-word unit.

8. The method of claim 3, wherein the training data comprises an equal distribution of text segments in different languages.

9. The method of claim 1, wherein augmenting the subset with an identifier for the machine learning task comprises prepending the subset with a token identifier for the machine learning task.

10. The method of claim 1, wherein the student machine learning model is smaller in size than the teacher machine learning models.

11. The method of claim 1, wherein the student machine learning model is larger in size or the same size as the teacher machine learning models.

12. The method of claim 1, wherein the size of each of the teacher machine learning models is independent of the student machine learning model.

13. A system comprising one or more computers and one or more storage devices storing instructions that are operable, when executed by the one or more computers, to cause the one or more computers to perform operations comprising:
obtaining a respective set of training data for each of a plurality of machine learning tasks;
for each of the machine learning tasks, configuring a respective teacher machine learning model to perform the machine learning task by training the teacher machine learning model on the training data for the task; and
training a single student machine learning model having a plurality of student machine learning model parameters to perform all of the plurality of machine learning tasks using (i) the configured teacher machine learning models, and (ii) the obtained training data, wherein training the single student machine learning model comprises:
for each of the plurality of machine learning tasks:
selecting one or more subsets from the set of training data for the machine learning task;
processing the selected subsets using the respective teacher machine learning model to generate respective teacher machine learning model outputs; and
training the single student machine learning model to perform the machine learning task using (i) the selected one or more subsets, and (ii) respective generated teacher machine learning model outputs, comprising, for each subset:
augmenting the subset with an identifier for the machine learning task;
processing the augmented subset using the student machine learning model to generate a student machine learning model output; and
adjusting values of the student machine learning model parameters to match the generated student machine learning model output to the respective generated teacher machine learning model output for the subset.

14. The system of claim 13, wherein the teacher machine learning model outputs comprise soft target outputs.

15. The system of claim 13, wherein the training data for each of the plurality of machine learning tasks comprises (i) an input text segment in an input language, and (ii) an output text segment in a target language that is different from the input language.

16. One or more non-transitory computer-readable storage media encoded with instructions that, when executed by one or more computers, cause the one or more computers to perform operations comprising:
obtaining a respective set of training data for each of a plurality of machine learning tasks;
for each of the machine learning tasks, configuring a respective teacher machine learning model to perform the machine learning task by training the teacher machine learning model on the training data for the task; and
training a single student machine learning model having a plurality of student machine learning model parameters to perform all of the plurality of machine learning tasks using (i) the configured teacher machine learning models, and (ii) the obtained training data, wherein training the single student machine learning model comprises:
for each of the plurality of machine learning tasks:
selecting one or more subsets from the set of training data for the machine learning task;
processing the selected subsets using the respective teacher machine learning model to generate respective teacher machine learning model outputs; and
training the single student machine learning model to perform the machine learning task using (i) the selected one or more subsets, and (ii) respective generated teacher machine learning model outputs, comprising, for each subset:
augmenting the subset with an identifier for the machine learning task;
processing the augmented subset using the student machine learning model to generate a student machine learning model output; and
adjusting values of the student machine learning model parameters to match the generated student machine learning model output to the respective generated teacher machine learning model output for the subset.

17. The non-transitory computer-readable media of claim 16, wherein the teacher machine learning model outputs comprise soft target outputs.

18. The non-transitory computer-readable media of claim 16, wherein the training data for each of the plurality of machine learning tasks comprises (i) an input text segment in an input language, and (ii) an output text segment in a target language that is different from the input language.

19. The non-transitory computer-readable media of claim 18, wherein the plurality of machine learning tasks comprise translating an input text segment in an input language into a target language.

20. The non-transitory computer-readable media of claim 19, wherein augmenting the subset with an identifier for the machine learning task comprises prepending each input text segment with a token identifying at least the target language.

* * * * *